US008091455B2

(12) United States Patent
McKeeth et al.

(10) Patent No.: US 8,091,455 B2
(45) Date of Patent: Jan. 10, 2012

(54) APPARATUS, SYSTEM, AND METHOD FOR CUTTING TUBES

(75) Inventors: Dave J. McKeeth, Arcadia, WI (US); Tim Fitzmaurice, Humbird, WI (US); Roger A. Kosmosky, Nellisville, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 494 days.

(21) Appl. No.: 12/022,357

(22) Filed: Jan. 30, 2008

(65) Prior Publication Data
US 2009/0188113 A1 Jul. 30, 2009

(51) Int. Cl.
B26D 3/16 (2006.01)

(52) U.S. Cl. .................. 83/54; 83/378; 83/382; 83/453; 83/319

(58) Field of Classification Search .............. 83/54, 375, 83/385, 859, 13, 319, 39, 49, 181, 182, 188, 83/192, 193, 374, 378, 382, 383, 452–456, 83/523, 555, 613, 616, 917; 30/109, 97, 30/92, 94, 95, 96; 72/70
See application file for complete search history.

(56) References Cited

U.S. PATENT DOCUMENTS

| 3,449,992 A | * | 6/1969 | Hanaway | 83/455 |
|---|---|---|---|---|
| 3,553,934 A | | 1/1971 | Johnson et al. | 53/183 |
| 3,563,119 A | | 2/1971 | Shashaty | 82/1 |
| 3,584,528 A | | 6/1971 | Leblond et al. | 83/208 |
| 3,598,005 A | | 8/1971 | Shafer | 82/46 |
| 3,600,991 A | | 8/1971 | Kojima et al. | 82/53.1 |
| 3,614,375 A | | 10/1971 | Becker | 219/91 |
| 3,643,057 A | | 2/1972 | Becker | 219/91 |
| 3,692,219 A | | 9/1972 | Franks | 225/2 |
| 3,718,960 A | | 3/1973 | Soderstrom et al. | 29/157.3 |
| 3,738,209 A | | 6/1973 | Davis | 83/98 |
| 3,778,583 A | | 12/1973 | Becker | 219/91 |
| 3,797,338 A | | 3/1974 | Molnar | 82/46 |
| 3,798,407 A | | 3/1974 | Becker | 219/92 |
| 3,813,972 A | | 6/1974 | Van Alsburg | 82/82 |
| 3,839,931 A | | 10/1974 | Herpich | 82/54 |
| 3,844,148 A | | 10/1974 | Patel et al. | 72/70 |
| 3,848,929 A | | 11/1974 | Miller | 299/39 |
| 3,851,515 A | | 12/1974 | Hautau | 72/121 |
| 3,864,951 A | | 2/1975 | Gulyaev et al. | 72/6 |
| 3,897,593 A | | 7/1975 | Becker | 219/92 |
| 3,930,324 A | | 1/1976 | Wightman et al. | 37/189 |
| 3,939,297 A | | 2/1976 | Aylard et al. | 13/29 |
| 3,970,232 A | | 7/1976 | Melton | 228/7 |

(Continued)

FOREIGN PATENT DOCUMENTS
JP 2007-83335 * 4/2007

*Primary Examiner* — Phong Nguyen
(74) *Attorney, Agent, or Firm* — Kunzler Needham Massey & Thorpe

(57) ABSTRACT

An apparatus, system, and method for cutting tubes has a scarf cut made in a direction transverse to a cut-off direction. The scarf cut passes through a thickness of a tube wall and forms an opening that receives a tip of a cut-off blade. The cut-off blade has cutting edges with an angle that engage ends of the opening such that a slug is forced upward and outward relative to the tubes. The scarf blade, the cut-off blade, and a clamping jaw may be moved in a coordinated manner by separate drivers operated under control of an electronic controller.

16 Claims, 4 Drawing Sheets

U.S. PATENT DOCUMENTS

| | | | |
|---|---|---|---|
| 3,997,097 A | 12/1976 | Embury | 228/7 |
| 4,003,278 A | 1/1977 | Shields | 83/186 |
| 4,009,362 A | 2/1977 | Becker | 219/92 |
| 4,037,073 A | 7/1977 | Becker | 219/92 |
| 4,055,741 A | 10/1977 | Bykhovsky et al. | 219/121 |
| 4,082,211 A | 4/1978 | Embury | 228/145 |
| RE29,762 E | 9/1978 | Becker | 219/92 |
| 4,117,296 A | 9/1978 | Becker | 219/91.21 |
| 4,120,583 A | 10/1978 | Hyatt | 355/86 |
| 4,205,566 A | 6/1980 | Molnar | 82/101 |
| 4,213,284 A | 7/1980 | Silverman et al. | 53/74 |
| 4,256,288 A | 3/1981 | Rojas | 266/70 |
| 4,326,438 A | 4/1982 | Ballerstein et al. | 82/53.1 |
| 4,329,096 A | 5/1982 | Herscovici | 409/15 |
| 4,345,744 A | 8/1982 | Leibinger et al. | 266/49 |
| 4,425,062 A | 1/1984 | Kawamura et al. | 408/28 |
| 4,476,368 A | 10/1984 | Cammann et al. | 219/64 |
| 4,541,316 A | 9/1985 | Fuminier | 82/59 |
| 4,562,760 A | 1/1986 | Kinsley | 83/693 |
| 4,563,927 A | 1/1986 | Kinsley | 83/319 |
| 4,570,907 A | 2/1986 | Anderson et al. | 266/69 |
| 4,596,541 A | 6/1986 | Ward, Sr. et al. | 493/59 |
| 4,601,249 A | 7/1986 | Frye | 112/121.14 |
| 4,604,083 A | 8/1986 | Barny et al. | 493/34 |
| 4,607,423 A | 8/1986 | Sleep, Jr. | 29/157.3 |
| 4,633,555 A | 1/1987 | Legge | 29/157.4 |
| 4,651,537 A | 3/1987 | Hagen | 62/320 |
| 4,653,368 A * | 3/1987 | Riera et al. | 83/319 |
| 4,673,103 A | 6/1987 | Anderson et al. | 221/186 |
| 4,676,128 A | 6/1987 | Kawasaki | 82/58 |
| 4,676,425 A | 6/1987 | Fujimura et al. | 228/45 |
| 4,679,201 A | 7/1987 | Klingel | 372/61 |
| 4,693,157 A | 9/1987 | Looser | 83/431 |
| 4,694,718 A | 9/1987 | Kinsley | 83/319 |
| 4,706,481 A | 11/1987 | Castricum | 72/49 |
| 4,709,471 A | 12/1987 | Valencic et al. | 29/605 |
| 4,712,457 A | 12/1987 | Percivalle et al. | 82/47 |
| 4,718,201 A | 1/1988 | Legge | 51/241 |
| 4,720,318 A | 1/1988 | Lines | 156/258 |
| 4,819,526 A | 4/1989 | Geise | 82/113 |
| 4,840,207 A | 6/1989 | Lines | 144/41 |
| 4,909,110 A * | 3/1990 | Borzym | 83/319 |
| 4,932,297 A * | 6/1990 | Borzym et al. | 83/319 |
| 4,932,723 A | 6/1990 | Mills | 299/86 |
| 4,940,880 A | 7/1990 | Klingel et al. | 219/121.67 |
| 4,953,377 A | 9/1990 | Thorell | 72/70 |
| 4,979,683 A | 12/1990 | Busdeker | 241/36 |
| 4,991,047 A | 2/1991 | Shiba et al. | 360/130.21 |
| 5,063,803 A | 11/1991 | Panneri et al. | 83/203 |
| 5,076,344 A | 12/1991 | Fields et al. | 164/457 |
| 5,089,447 A | 2/1992 | Timm et al. | 501/87 |
| 5,096,518 A | 3/1992 | Fujikawa et al. | 156/89 |
| 5,100,506 A | 3/1992 | Sturtevant et al. | 156/645 |
| 5,105,700 A | 4/1992 | Kusakabe | 83/318 |
| 5,137,097 A | 8/1992 | Fernandez | 175/228 |
| 5,167,907 A | 12/1992 | Mauget et al. | 376/260 |
| 5,173,766 A | 12/1992 | Long et al. | 257/687 |
| 5,177,901 A | 1/1993 | Smith | 51/5 D |
| 5,199,516 A | 4/1993 | Fernandez | 175/344 |
| 5,214,988 A | 6/1993 | Quigley | 82/48 |
| 5,215,945 A | 6/1993 | Dubensky et al. | 501/94 |
| 5,217,479 A | 6/1993 | Shuler | 606/180 |
| 5,223,460 A | 6/1993 | Dubensky et al. | 501/94 |
| 5,224,560 A | 7/1993 | Fernandez | 175/374 |
| 5,255,497 A | 10/1993 | Zoromski et al. | 53/551 |
| 5,256,608 A | 10/1993 | Dubensky et al. | 501/94 |
| 5,302,234 A | 4/1994 | Grace et al. | 156/640 |
| 5,350,098 A | 9/1994 | Oakley et al. | 225/2 |
| 5,395,476 A | 3/1995 | Debroche et al. | 156/397 |
| 5,421,185 A | 6/1995 | Castricum | 72/338 |
| 5,472,367 A | 12/1995 | Slocum et al. | 451/5 |
| 5,477,717 A | 12/1995 | Skrebergene et al. | 72/49 |
| 5,490,559 A | 2/1996 | Dinulescu | 165/148 |
| 5,507,766 A | 4/1996 | Kugo et al. | 606/194 |
| 5,512,007 A | 4/1996 | De Lucia et al. | 451/75 |
| 5,513,485 A | 5/1996 | Hashimoto et al. | 56/294 |
| 5,518,346 A | 5/1996 | Geise | 409/132 |
| 5,523,538 A | 6/1996 | Matsuda | 219/69.12 |
| 5,527,204 A | 6/1996 | Rhoades | 451/40 |
| 5,531,370 A | 7/1996 | Rohrberg | 228/173.4 |
| 5,553,526 A * | 9/1996 | Kusakabe et al. | 83/319 |
| 5,570,502 A | 11/1996 | Sawtell et al. | 29/527.6 |
| 5,570,620 A | 11/1996 | Okonski et al. | 83/152 |
| 5,586,476 A | 12/1996 | Esser | 82/1.11 |
| 5,588,289 A | 12/1996 | Wilson | 56/13.1 |
| 5,597,276 A | 1/1997 | Yokell | 409/132 |
| 5,609,055 A | 3/1997 | Castricum | 72/49 |
| 5,616,421 A | 4/1997 | Sawtell et al. | 428/614 |
| 5,653,022 A | 8/1997 | Logic | 29/890.053 |
| 5,660,748 A | 8/1997 | Tanaka et al. | 219/121.84 |
| 5,666,840 A | 9/1997 | Shah et al. | 72/55 |
| 5,676,012 A | 10/1997 | Ceriale | 72/294 |
| 5,679,058 A | 10/1997 | Rhoades | 451/40 |
| 5,690,011 A * | 11/1997 | Hill et al. | 83/319 |
| 5,692,421 A | 12/1997 | Rohrberg | 82/1.2 |
| 5,697,453 A | 12/1997 | Van Den Bosch | 172/41 |
| 5,762,873 A | 6/1998 | Fanning et al. | 422/65 |
| 5,782,673 A | 7/1998 | Warehime | 451/2 |
| 5,811,055 A | 9/1998 | Geiger | 266/49 |
| 5,856,193 A | 1/1999 | Fanning et al. | 436/48 |
| 5,856,631 A | 1/1999 | Julien | 89/16 |
| 5,868,531 A | 2/1999 | Sandford | 407/114 |
| 5,869,006 A | 2/1999 | Fanning et al. | 422/67 |
| 5,887,498 A | 3/1999 | Miyamoto et al. | 82/1.11 |
| 5,891,396 A | 4/1999 | Karl et al. | 422/65 |
| 5,893,315 A | 4/1999 | Miller | 83/320 |
| 5,894,771 A | 4/1999 | Braun et al. | 82/47 |
| 5,908,349 A | 6/1999 | Warehime | 451/102 |
| 5,965,090 A | 10/1999 | Fanning et al. | 422/65 |
| 5,994,667 A | 11/1999 | Merdan et al. | 219/121.67 |
| 6,003,221 A | 12/1999 | Sawtell et al. | 29/527.6 |
| 6,019,070 A | 2/2000 | Duffy | 122/209.1 |
| 6,026,725 A | 2/2000 | Okonski | 83/698.21 |
| 6,038,950 A | 3/2000 | Ogawa et al. | 83/54 |
| 6,042,309 A | 3/2000 | Sandford | 407/114 |
| 6,061,905 A | 5/2000 | Logic | 29/890.053 |
| 6,065,209 A | 5/2000 | Gondouin | 29/890.14 |
| 6,076,444 A | 6/2000 | Okonski | 83/99 |
| 6,077,152 A | 6/2000 | Warehime | 451/75 |
| 6,086,824 A | 7/2000 | Fanning et al. | 422/65 |
| 6,102,636 A | 8/2000 | Geise | 409/231 |
| 6,119,330 A | 9/2000 | Cheng | 29/563 |
| 6,119,570 A | 9/2000 | Okonski et al. | 83/522.15 |
| 6,129,755 A | 10/2000 | Mathis et al. | 623/1.15 |
| 6,146,476 A | 11/2000 | Boyer | 148/525 |
| 6,159,237 A | 12/2000 | Alt et al. | 623/1.11 |
| 6,190,406 B1 | 2/2001 | Duerig et al. | 623/1.2 |
| 6,203,416 B1 | 3/2001 | Mizuno et al. | 451/548 |
| 6,229,112 B1 | 5/2001 | Scott et al. | 219/121.67 |
| 6,236,013 B1 | 5/2001 | Delzenne | 219/121.54 |
| 6,242,391 B1 | 6/2001 | Fukutani et al. | 508/180 |
| 6,245,100 B1 | 6/2001 | Davila et al. | 623/1.13 |
| 6,258,759 B1 | 7/2001 | Futahashi et al. | 508/143 |
| 6,296,615 B1 | 10/2001 | Brockway et al. | 600/486 |
| 6,296,661 B1 | 10/2001 | Davila et al. | 623/1.13 |
| 6,336,388 B1 | 1/2002 | Marocco | 83/454 |
| 6,342,067 B1 | 1/2002 | Mathis et al. | 623/1.15 |
| 6,371,691 B1 | 4/2002 | Finzel et al. | 405/157 |
| 6,402,438 B1 | 6/2002 | Boyer | 408/144 |
| 6,435,783 B1 | 8/2002 | Rusch | 409/132 |
| 6,462,301 B1 | 10/2002 | Scott et al. | 219/121.67 |
| 6,503,271 B2 | 1/2003 | Duerig et al. | 623/1.15 |
| RE38,033 E | 3/2003 | Okonski et al. | 83/24 |
| 6,533,021 B1 | 3/2003 | Shibata et al. | 164/312 |
| 6,533,040 B2 | 3/2003 | Gondouin | 166/380 |
| 6,568,303 B1 | 5/2003 | Bentley | 82/47 |
| 6,595,844 B1 | 7/2003 | Mizuno et al. | 451/540 |
| 6,595,845 B1 | 7/2003 | Mizuno et al. | 451/548 |
| 6,598,813 B1 | 7/2003 | Matsuda | 241/27 |
| 6,615,702 B1 | 9/2003 | Julien | 89/16 |
| 6,619,162 B1 | 9/2003 | Dietrich | 82/46 |
| 6,623,800 B2 | 9/2003 | Furuichi | 427/250 |
| 6,644,358 B2 | 11/2003 | Demarest et al. | 138/177 |
| 6,664,499 B1 | 12/2003 | Brink et al. | 219/121.67 |
| 6,666,259 B2 | 12/2003 | Shibata et al. | 164/457 |
| 6,669,685 B1 | 12/2003 | Rizoiu et al. | 606/10 |
| 6,675,684 B2 * | 1/2004 | Chezzi et al. | 83/319 |

| | | |
|---|---|---|
| 6,709,002 B2 | 3/2004 | Tambornino ............... 280/511 |
| 6,739,055 B2 | 5/2004 | Lee ............................ 30/98 |
| 6,772,765 B2 | 8/2004 | Scheller et al. ............ 128/898 |
| 6,832,536 B2 | 12/2004 | Dittmar ...................... 83/184 |
| 6,837,410 B1 | 1/2005 | Yeh ........................... 225/93.5 |
| 6,863,685 B2 | 3/2005 | Davila et al. ............... 623/1.34 |
| 6,865,792 B2 | 3/2005 | Kash .......................... 29/455.1 |
| 6,866,448 B2 | 3/2005 | Finzel et al. ................ 405/157 |
| 6,874,398 B2 | 4/2005 | Binggeli ..................... 83/500 |
| 6,915,621 B2 | 7/2005 | Saraf et al. ................. 53/450 |
| 6,927,359 B2 | 8/2005 | Kleine et al. ............. 219/121.72 |
| 6,935,404 B2 | 8/2005 | Duerig et al. ............... 164/95 |
| 6,971,981 B2 | 12/2005 | Dobslaw et al. ............ 493/346 |
| 7,017,459 B2 | 3/2006 | Marocco ...................... 83/13 |
| 7,025,108 B2 | 4/2006 | Hentschel et al. ........... 164/17 |
| 7,048,428 B2 | 5/2006 | Tahara et al. ............... 362/626 |
| 7,056,396 B2 | 6/2006 | Oishi .......................... 148/434 |
| 7,056,550 B2 | 6/2006 | Davila et al. ............... 427/2.24 |
| 7,064,276 B2 | 6/2006 | Sakabe et al. .............. 174/110 |
| 7,107,676 B2 | 9/2006 | Fridrich ...................... 29/882 |
| 7,124,672 B2 | 10/2006 | Marocco ...................... 83/197 |
| 7,134,955 B2 | 11/2006 | Steinke et al. .............. 452/48 |
| 7,148,446 B2 | 12/2006 | Harnisch et al. ......... 219/121.67 |
| 7,175,654 B2 | 2/2007 | Bonsignore et al. ........ 623/1.15 |
| 7,195,640 B2 | 3/2007 | Falotico et al. ............. 623/1.42 |
| 7,201,454 B2 | 4/2007 | Mathiez ...................... 300/2 |
| 7,214,011 B2 | 5/2007 | Ryai, Sr. et al. ............ 409/81 |
| 7,214,240 B2 | 5/2007 | Bonsignore et al. ........ 623/1.19 |
| 7,255,171 B2 | 8/2007 | Rudd .......................... 166/297 |

* cited by examiner

APPARATUS, SYSTEM, AND METHOD FOR CUTTING TUBES

BACKGROUND OF THE INVENTION

1. Field of the Invention

This invention relates to cutting tubes and more particularly relates to a tube cutting machine and method for improved cutting of tubes including tubes having bent portions.

2. Description of the Related Art

There are a variety of devices used for cutting tubes including manual pipe cutting tools, and saws that are conventionally used for cutting pipes and other tubular materials. For automated processes in factory settings, tube cutting machines or large power saws are often utilized. Fixtures may be used to hold tubes having bends in place while these tubes are cut by a band saw, for example. This process is messy and time consuming. Cutting tubes with saws in this manner also requires additional steps of deburring and/or cleaning to remove burrs that are inherent with the sawing process and to remove lubricant that is used to aid the cutting process.

Cleaner and more efficient machines such as those shown and described in U.S. Pat. Nos. 4,563,927 and 4,694,718 issued to Kinsley and assigned to Vogel Tool & Die Corporation (Vogel) implement a shearing process. The Vogel machine moves each of a scarf blade and a clamp by a cam mechanism that is actuated by a driving mechanism that also moves the cut-off blade. As such, the clamping movement and scarf cutting, both of which are effected in a horizontal direction, have a very limited range, as can be noted in the figures and as described in the Abstract of the Vogel patents. The range of motion for one of the clamps relative to the other is approximately an eighth to a quarter of an inch. Thus, in order to place a tube in the jaws for cutting, the tube must be inserted in a direction of the tube's axis through the opening between the jaws when the jaws have been opened the slight amount. Then the jaws are clamped on the tube in preparation for cutting. Therefore, the Vogel machines are not as versatile in handling tubes having other than straight configurations, and saws with Fixtures are typically used for cutting tubes that have bends. In either case additional steps may be needed to clean and/or deburr or otherwise finish a tube end.

The step of scarf cutting in the Vogel devices is for the purpose of thinning the tube so that the subsequent cut-off step does not deform the tube when punching through the thinned, scarffed portion. As may be appreciated, the shearing action of the Vogel devices during cut-off is a very energetic operation that will dent many of the materials being cut unless they are first thinned by a scarfing step. Relatedly, the Vogel machines are much faster than saws for cutting tubes, and the shearing operation does not leave chips of material as do saws. However, the Vogel machines often produce a double layer of slug material by squishing an upper portion of the material (near the thinned portion of the tube) against a lower portion of the material (a lower portion of the tube). This squishing of two layers together in which the lower layer is forced through by the upper layer and the cut-off blade during cut-off causes an untidy cut that must often be corrected by subsequent steps before the cut pieces can be shipped.

SUMMARY OF THE INVENTION

From the foregoing discussion, it should be apparent that a need exists for an apparatus, system, and method that improves a quality of a cut when cutting a tube, and perhaps remove or reduce a need for additional steps after cutting. Beneficially, such an apparatus, system, and method would enable cutting tubes that have bent portions as well as straight tubes, and enable increased speed in cutting.

The present invention has been developed in response to the present state of the art, and in particular, in response to the problems and needs in the art that have not yet been fully solved by currently available tube cutting machines and methods. Accordingly, the present invention has been developed to provide an apparatus, system, and method for cutting tubes that overcome many or all of the above-discussed shortcomings in the art.

The apparatus, in one embodiment, is configured to cut tubes and includes a machine frame and at least a first elongate rail supported on the frame. First and second jaws are also supported on the frame. The second jaw is movable relative to the first jaw for clamping engagement of a work piece between the jaws. A motive member is coupled to the second jaw for urging the second jaw toward the first jaw in a closing direction. At least a second elongate rail is supported on the frame in a relatively transverse relation to the first elongate rail. A cut-off blade is supported on the first elongate rail for movement along a length of the first elongate rail in a first cut-off direction. A scarf blade is supported on the second elongate rail for movement along a length of the second elongate rail in a second scarfing direction.

The apparatus is further configured, in one embodiment, to provide the closing direction generally parallel to the first cut-off direction.

In a further embodiment, the apparatus may be configured to provide a tube cutting machine that has a machine base and a frame connected to the base. The machine base and frame, in this embodiment, form a C-frame. A lower arcuate jaw is supported on the machine base. At least a first elongate rail is supported on the frame. An upper arcuate jaw is movably supported on the frame by a jaw block supported on the first elongate rail. The upper arcuate jaw is movable relative to the lower arcuate jaw and is configured for clamping engagement of a work piece between the arcuate jaws. A first driver is coupled to the upper arcuate jaw for urging the upper arcuate jaw toward the lower arcuate jaw in a closing direction, and away from the first arcuate jaw in an opening direction. At least a second elongate rail is located in the jaw block. The second elongate rail is disposed in the jaw block transversely to the first elongate rail. A cut-off blade is supported on the first elongate rail for movement along a length of the first elongate rail. The cut-off blade has a shearing edge extending at an angle of approximately twenty-two degrees relative to the opening direction and a punching tip that has a punching edge extending from a distal end of the shearing edge at an angle greater than or equal to the angle of the shearing edge relative to the opening direction. A second driver is coupled to the first cut-off blade for urging the first cut-off blade past the upper and lower arcuate jaws in a direction substantially parallel to the closing direction. An elongate scarf blade has a piercing tip at one longitudinal end. The elongate scarf blade is supported on the second elongate rail for movement along a length of the second elongate rail in a second direction transverse to the opening and closing directions. A third motive member is coupled to the scarf blade for urging the scarf blade past the upper arcuate jaw for cutting a notch in a work piece to a depth of a square circumscribed in the upper and lower arcuate jaws.

A system of the present invention is also presented to describe how the embodiments are not limited to parts and pieces that make up the tube cutting machine. The system may be embodied in any of a variety of shop or manufacturing settings including greater or lesser automation, for example.

In particular, the system, in one embodiment, includes a machine base and a frame supported on the machine base. A lower jaw is supported on the base and a first elongate rail is supported on the frame. An upper jaw is supported on the first elongate rail in this embodiment. The upper jaw is movable along the first elongate rail relative to the lower jaw and is adapted for clamping engagement of a work piece between the upper and lower jaws. A jaw driver is coupled to the upper jaw for urging the upper jaw toward the lower jaw in a first closing direction. A cut-off blade is supported on the first elongate rail for movement along a length of the first elongate rail. A cut-off blade driver is coupled to the cut-off blade for urging the cut-off blade along the first elongate rail. A second elongate rail is supported on the frame in a relatively transverse relation to the first elongate rail. A scarf blade is supported on the second elongate rail for movement along a length of the second elongate rail in a second direction transverse to the first closing direction. A scarf blade driver is coupled to the scarf blade for urging the scarf blade in the second direction. A controller is operatively connected to each of the drivers. The controller is configured to move the upper jaw, the cut-off blade, and the scarf blade by way of the drivers in a coordinated manner.

A method of the present invention is also presented for elucidation regarding how the apparatuses and systems of the present invention may be used in cutting tubes. As such, the method in the disclosed embodiments substantially includes the steps necessary to carry out the functions presented above with respect to the operation of the described apparatus and system. Additionally, the method includes steps that may be implemented on other apparatuses or systems. In one embodiment, the method includes clamping a tube in a first direction and scarf cutting the tube in a second direction transverse to the first direction. In one embodiment, the method includes cutting off the tube in the first direction. In an embodiment of the method, cutting off the tube includes inserting a cut-off blade in an opening of the tube formed by the scarf blade during a prior step of scarf cutting.

Clamping in accordance with an embodiment of the method may include driving at least one clamp member with a first driver. Scarf cutting may include driving a scarf blade with a second driver. Cutting off the tube may include driving the cut-off blade with a third driver. The first, second, and third drivers may be three distinct drivers.

In a further embodiment, the method includes controlling the steps of clamping, scarf cutting, and cutting off the tube and coordinating the steps of clamping, scarf cutting, and cutting off the tube. The steps of controlling and coordinating may include automatically controlling and coordinating by an electronic controller.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
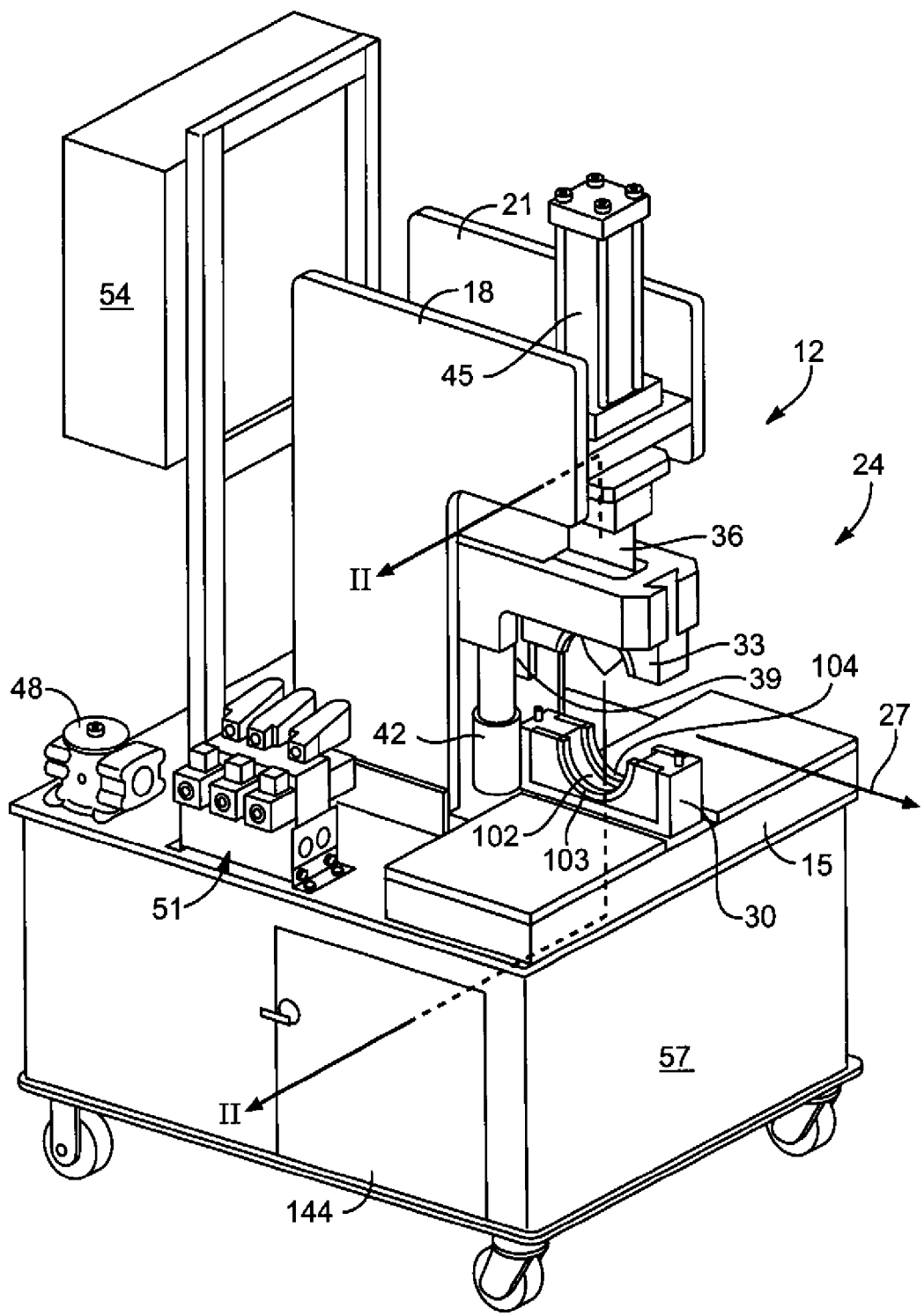
FIG. 1 is a perspective view illustrating one embodiment of a tube cutting machine in accordance with the present invention.

FIG. 1 depicts a tube cutting machine 12 in accordance with an embodiment of the present invention. The tube cutting machine 12 has a base 15 and a pair of upright frame members 18, 21 supported on the base 15. The base 15 and upright frame members 18, 21 form a C-frame 24 that opens out in a sideways direction 27.

The base 15 supports a lower jaw 30 and the frame members 18, 21 support an upper jaw 33 and a cut-off blade 36 on at least one elongate rail 39 for facilitating vertical movement of the upper jaw 33 and the cut-off blade 36, as will be described in greater detail below. The tube cutting machine 12 includes a clamping driver 42 and a cut-off blade driver 45 each of which may take the form of a hydraulic ram. Other types of drivers may include but are not limited to pneumatic rams or motor driven threaded shaft drivers, for example. The clamping driver 42, cut-off blade driver 45, and any additional drivers may be driven by a hydraulic pump 48 and a set of hydraulic solenoids 51, for example. The pump 48, solenoids 51, and drivers (including drivers 42 and 45 may be controlled and coordinated by a PLC or other electronic controller in the control box 54. As shown in FIG. 1, the tube cutting machine 12 may include a movable table 57 that supports the base 15, frames 18, 21, drivers 42, 45, pump 48, solenoids 51, control box 54, and other elements that make up the tube cutting machine 12.

Figure 2:
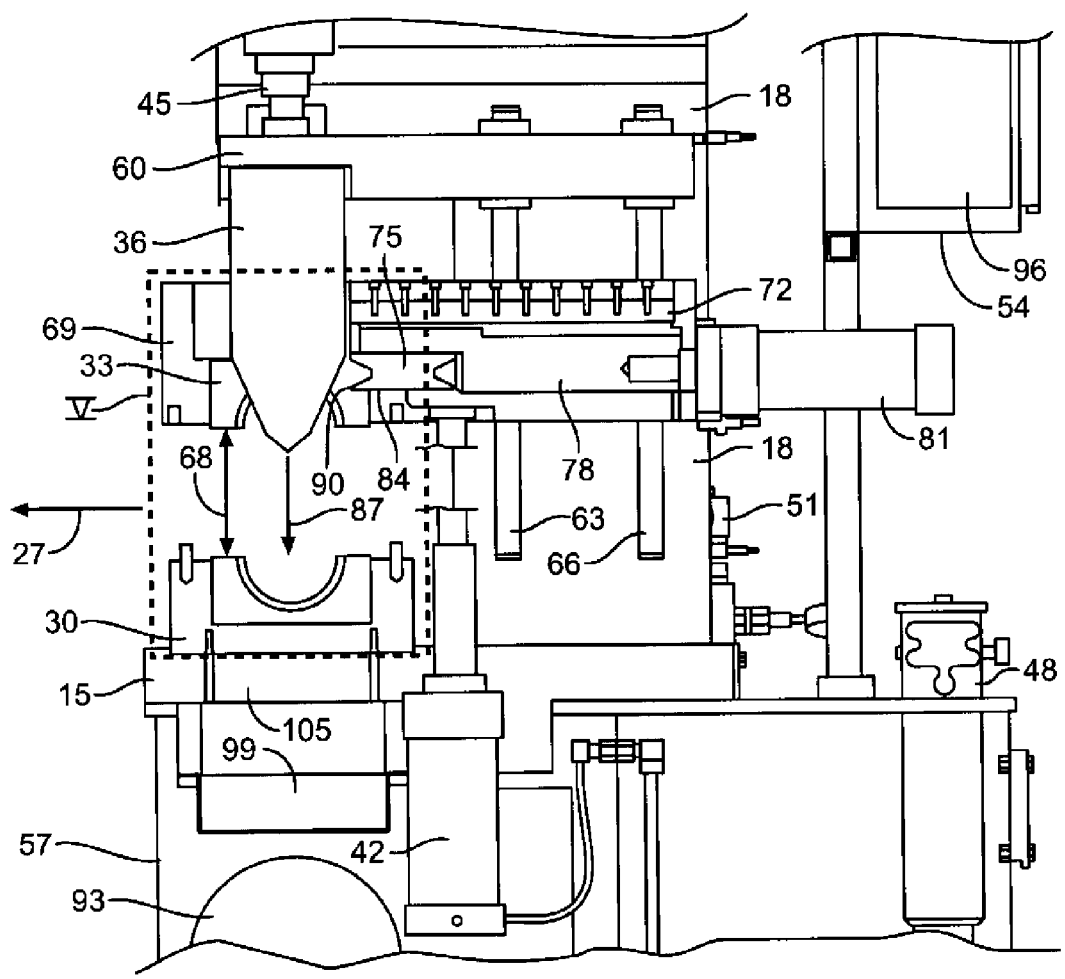
FIG. 2 is a sectional view taken along a line II-II of the tube cutting maching of FIG. 1.

FIG. 2 is a diagrammatic sectional view taken along line II-II of FIG. 1. Thus, FIG. 2 represents a view in a plane slicing between front and rear portions of the upper and lower jaws 30, 33 on a back side of the cut-off blade 36 looking forward. This view shows the cut-off blade 36 supported by an upper plate 60 and driven by the cut-off blade driver 45. The upper plate 60 is supported on elongate rails 63, 66 similar to the elongate rail 39 shown in FIG. 1 such that the upper plate 60 is supported by four parallel elongate rails total (one not shown) with a pair of the rails on inner surfaces of the upright frame members 18, 21. The elongate rails 63, 66 each have a length greater than a space between the upper and lower jaws 33, 30 in a closed position such that the jaw driver 42 can move the upper jaw 33 away from the lower jaw 30 to a distance 68 greater than the space. This configuration enables insertion of tubes to be cut into the jaws in a sideways direction through an opening between the lower and upper jaws 30, 33. The elongate rails 63, 66 also support a jaw block 69.

The jaw block 69 supports the upper jaw 33 on the elongate rails and is driven by the clamping driver 42. The upper plate 60 and the cut-off blade 36 move together and are capable of being moved independently from movement of the jaw block 69 and the upper jaw 33 that move together.

As shown in FIG. 2, the jaw block has at least one horizontally extending elongate rail 72 disposed thereon. A scarf blade 75 is supported on the jaw block 69 by the horizontally extending elongate rail 72. A scarf blade holder 78 slidably supports the scarf blade 75 on the rail 72 and is coupled to a scarf blade driver 81. The scarf blade holder 78 and rail support and guide the scarf blade 75 such that a lower edge 84 of the scarf blade is positioned precisely at a predetermined height relative to a height of a tube to be cut as will be described below.

As shown in FIG. 2, the scarf blade 75 is elongate and extends longitudinally in a direction corresponding to the sideways direction 27. The scarf blade 75 and the scarf blade holder 78 are supported on the horizontally extending elongate rail 72 for movement in the sideways direction 27 transverse to a vertical direction 87 of the cut-off blade 36 and the upper jaw 33. The scarf blade 75 has a piercing tip 90 on a longitudinal end of the scarf blade 75. The piercing tip 90 will thus be moved horizontally into contact with a tube to be cut during a scarf cut after a clamping movement of the upper clamp 33 in the vertical direction, and before a vertical cut-off movement of the cut-off blade, as will be described in greater detail below. The movement of the cut-off blade 36 and the upper jaw 33 in the same vertical direction 87 is due to the fact that they are both supported on the same vertical elongate rails 63, 66. The movement of the scarf blade 75 and the scarf blade holder is described and shown as being horizontal in the sideways direction 27 and perpendicular to the vertical direction 87. However, the scarfing direction may be at any transverse angle relative to the cut-off direction, and the clamping direction may be at any angle that is parallel to or transverse to either of the cut-off direction and the scarfing direction.

FIG. 2 also shows details below the base 15 inside the movable table 57. For example, a hydraulic tank 93 supplied hydraulic fluid for the hydraulic pump 48 to pump to and from the drivers 42, 45, and 81 based on the operation of the solenoid valves 51 under the control of an electronic controller 96 within the control box 54.

Also shown in FIG. 2 is a tray 99 for catching slugs removed during the scarf cut and cut-off operations. As shown in FIG. 1, there is an opening 102 between a forward portion 103 and a rearward portion 104 of the lower jaw 30. There is also an opening through the base 15 at 105 in communication with the opening 102 between the forward and rearward portions 103, 104 of the lower jaw 30. Thus, material being removed during scarfing and cutting off of a tube forms slugs that fall through the openings 102 and 105 into the tray 99 where they are collected for periodic disposal. The tray 99 is easily accessible and removable through a door 108 shown in FIG. 1.

Figure 3:
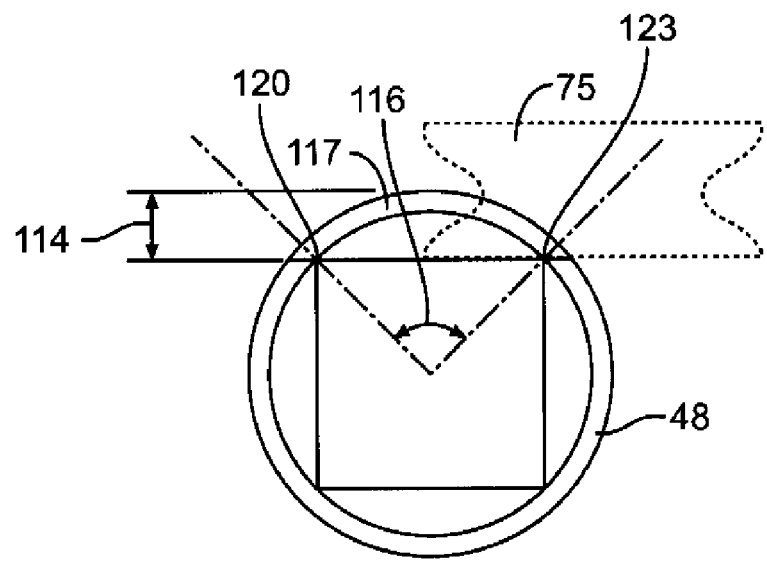
FIG. 3 is diagrammatic front view illustrating a scarf cut made to a predetermined depth.

FIG. 3 shows a diagrammatic sectional view of a tube 111 with material removed to a depth 114 by a scarf cut by the scarf blade 75 in order to prepare the tube 111 for cut-off. This opening action by the scarf blade 75 creates an opening of an arc having an angle 116, which may be greater or less than the angle shown in FIG. 3. The scarf cut is sufficiently deep to pass through a thickness of the tube 111. In this way, the cut-off blade 36 is not required to shear material when a tip of the cut-off blade initially enters through an opening 117 left by the scarf cut. Rather, the first shearing by the cut-off blade 36 occurs when the cut-off blade 36 engages arc ends 120, 123 of the opening 117.

Figure 4:
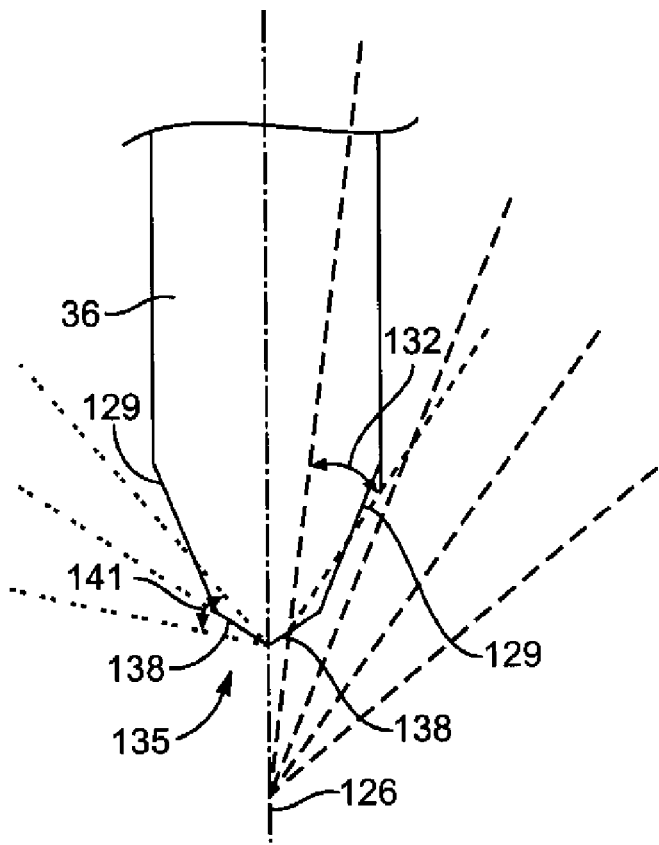
FIG. 4 is a diagrammatic front view of a cut-off blade illustrating ranges of possible angles for cutting and punching edges.

FIG. 4 is a front view of the cut-off blade 36 in accordance with an embodiment of the invention. The cut-off blade 36 is configured to perform a cut-off operation by being forced in the vertical direction 87 that is aligned with a longitudinal axis 126 of the cut-off blade 36. The cut-off blade is pushed by the cut-off blade driver 45 through a material of a tube to be cut off with the forward portion 103 and the rearward portion 104 of the lower jaws 30 and the forward and rearward portions of the upper jaws (not shown) immediately before and behind the cut-off blade 36. Thus, a shearing action is caused to take place. The shearing action begins when shearing edges 129 engage the arc ends 120, 123 of the opening 117 shown in FIG. 3.

The shearing edges 129 shown in FIG. 4 extend at an angle of approximately twenty-two and a half degrees relative to the longitudinal axis 126, (and the cut-off or vertical direction 87 shown in FIG. 2.) However, it is to be understood that the cut-off blade 36 may have the shearing edges 129 extending at any angle in a range from ten to thirty degrees relative to the cut-off or vertical direction 87, as indicated at 132.

The cut-off blade 36 has a punching tip 135 that has respective punching edges 138 for cutting or punching through a bottom of the tube during cut-off. Each of the punching edges 138 extend at an angle greater than or equal to the angle of the shearing edges 129 relative to the axis 126 (and cut-off or vertical direction 87 shown in FIG. 2.) For example, the punching edges may extend at angles in a range from thirty-five to eighty-five degrees relative to the cut-off direction 87, as indicated at 141. The punching tip 135 extends distally from the shearing edges 129 to form a distal end of the cut-off blade 36. In an embodiment of the present invention, the angle of the punching edges 138 is approximately forty-five degrees relative to the cut-off direction 87.

Referring back to FIGS. 1 and 2, the upper and lower jaws 33, 30 are each shown as semi-circular. The scarf blade 36 is supported at a position for cutting a notch or opening 120 substantially along a ninety degree arc of the tube 111, as shown in FIG. 3. In another embodiment, the scarf blade 36 may be supported at a predetermined position corresponding to a chord of an inner surface of the upper jaw 33 that forms one side of a circumscribed square in a clamping opening of the jaws 30, 33 when the jaws are in a closed position. The scarf cut may be set at any predetermined depth including from fifteen-hundredths of the tube diameter to one-half of the tube diameter. However, the depth of cut should provide the size of opening needed for the cut-off blade to perform its function described herein. The invention has been described herein with regard to round cross section tubes. However, the principles of this invention may be applied without limitation to square tubes and/or tubes having other cross sectional configurations.

For purposes of this disclosure, the tube cutting machine 12 may be referred to as a tube cutter. A tube cutting system in accordance with embodiments of the present invention may include more or less elements than those described with regard to the tube cutting machine shown in FIGS. 1-4. Generally, the system for cutting tubes would include more elements, which may not directly deal with the mechanisms that engage a work piece (or tube). For example, the electronic controller 96 would definitely be part of a system for cutting tubes, but would not necessarily be part of the tube cutting machine 12. Similarly, any software may not be considered part of the machine. Yet the software (if utilized) would be part of the system. The movable table 57 may also be part of the system and not part of the tube cutting machine 12. On the other hand, the tube cutting machine 12 may be interpreted to include the whole tube cutting system.

From this description, it will become apparent that the tube cutter or tube cutting machine with regard to the various embodiments described herein includes means for clamping a tube in a first direction. The tube cutter or tube cutting machine also includes means for scarf cutting the tube in a second direction that is transverse to the first direction, and means for cutting off the tube in the first direction. The means for cutting off the tube includes the scarf blade 75 and the cut-off blade 36.

The diagrammatic illustrations of stages illustrated in FIGS. 5A-5F and the description of the method that follows are generally set forth as diagrams of the logical flow of a method in accordance with an embodiment of the invention. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The diagrams of FIGS. 5A-5F are partial sectional view diagrams in which a rearward portion of the upper jaw 33 has been removed while the rearward portion 104 of the lower jaw 30 is shown. Various stages of an embodiment of the method are depicted by relative position of elements in FIGS. 5A-5F. FIGS. 5A-5F show a diagram of part of the tube cutting machine 12 corresponding to a region V, (marked by a dashed line box in FIG. 2.)

Figure 5A:
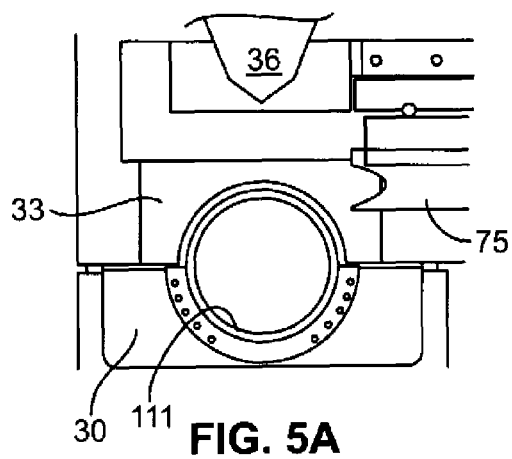
FIGS. 5A-5F are diagrammatic views illustrating a region V of FIG. 2 during stages in a cutting process.
Figure 5B:
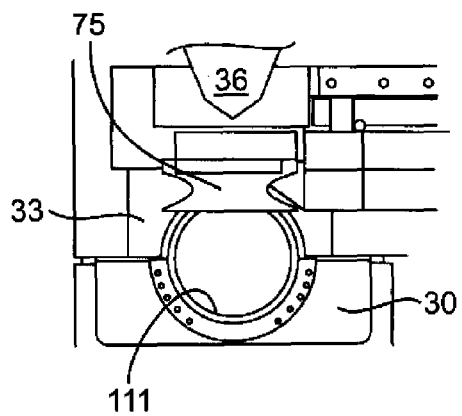
Figure 5C:
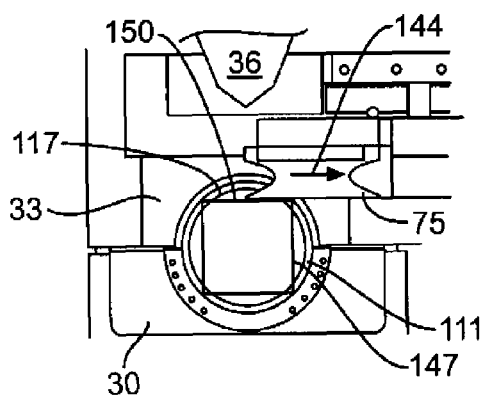

FIG. 5A shows the tube cutting machine in a position in which the scarf blade 75 and the cut-off blade are at respective home positions. A preliminary step of closing the jaws 30, 33, and clamping the work piece (tube 111) between the jaws 30, 33. The machine initiates the method by a preparation step of moving the scarf blade 75 from home to a scarf full stroke position, as shown in FIG. 5B. This step removes a scarf slug from the tube 111. FIG. 5C depicts the scarf blade 36 at mid-stroke returning in a direction of arrow 144 from the full stroke position. FIG. 5C also shows how the depth of the scarf cut may be selected to remove material to a predetermined depth. In the example of FIG. 5C, a depth reaching to a side of an imaginary square 147 that is circumscribed in a circle formed by the inner surface of the jaws 30, 33 is selected. Thus, a notch or opening 117 extends down to an upper side 150 of the imaginary square 147.

Figure 5D:
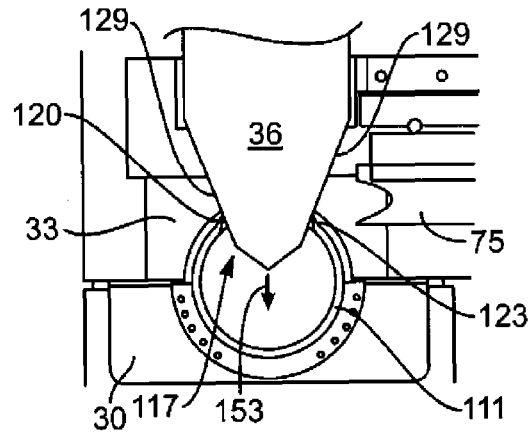
Figure 5E:
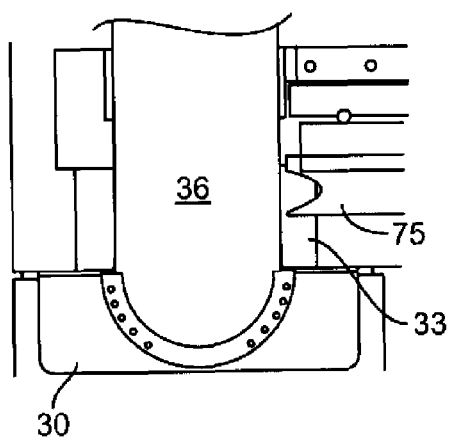
Figure 5F:
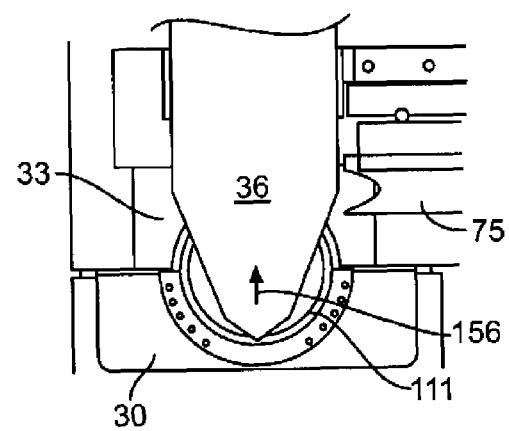

FIG. 5D depicts the scarf blade 75 having returned to its home position, and the cut-off blade 36 at mid-stroke traveling in a direction of arrow 153. In an embodiment of the method, the shearing edges 129 of the cut-off blade 36 have begun to engage the arc ends 120, 123 of the opening 117 and are splaying them upward and outward, as shown in FIG. 5D. The direction of splaying is a function of a number of things including material characteristics of the tube 11, the angle of the shearing edges 129, and the position of the arc ends 120, 123 along the circumference of the tube 111. for example, if the opening formed by the scarf cut is smaller, then the angle of the shearing edges 129 will need to be smaller relative to the cut-off direction 153. Otherwise, the material near a top of the tube 111 will tend to fold downward and inward during cut-off. The result will be a double layer cut-off slug that causes defects in the cut. FIG. 5E depicts the cut-off blade 36 at a full stroke position having cut off the tube 111. FIG. 5F shows the cut-off blade 36 returning in a direction indicated by arrow 156 after having completed the cut-off operation. Once the cut-off blade 36 has reached a particular height in its return home, the jaws 30, 33 may be opened for an insertion of the next tube to be cut.

In an embodiment of the method, a step of scarf cutting includes cutting the tube 111 to a depth in a range from one tenth to one half of a height of the tube. In one embodiment, the step of scarf cutting includes cutting the tube 111 to a depth of approximately fifteen hundredths a height of the tube being cut. In another embodiment, the step of scarf cutting includes opening an arc in the tube of approximately ninety degrees for the reasons set forth herein. The step of cutting off the tubes includes shearing the tube by engaging material at the ends 120, 123 of the arc by an edge 129 of the cut-off blade 36 that extends at approximately twenty-two and a half degrees relative to the first direction (a clamping and/or cut-off direction.) Another embodiment of the invention includes avoiding doubling a material of the tube 111 on itself by the steps of scarf cutting and cutting off.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tube cutter, comprising:
means for clamping a tube in a first direction;
means for scarf cutting the tube in a second direction that is transverse to the first direction, the means for scarf cutting the tube in the second direction comprising a scarf blade movable in the second direction along a first rail; and means for cutting off the tube in the first direction, the means for cutting off the tube in the first direction comprising a cut-off-blade and a jaw block, wherein the jaw block supports a portion of the means for clamping and is slidably movable in the first direction along a second rail to urge in the first direction a portion of the means for clamping and the first rail toward another portion of the means for clamping, wherein the first rail is disposed on the jaw block and extends generally transversely relative to the first direction.

2. A tube cutting machine, comprising:

a machine base and a frame connected to the base, the machine base and frame forming a C-frame;

a lower arcuate jaw supported on the machine base;

at least a first elongate rail supported on the frame;

an upper arcuate jaw movably supported on the frame by a jaw block that is supported on the first elongate rail, the upper arcuate jaw being movable relative to the lower arcuate jaw and configured for clamping engagement of a work piece between the arcuate jaws;

a first driver coupled to the upper arcuate jaw for urging the upper arcuate jaw toward the lower arcuate jaw in a closing direction, and away from the first arcuate jaw in an opening direction;

at least a second elongate rail in the jaw block, the second elongate rail disposed in the jaw block transversely to the first elongate rail;

a cut-off blade supported on the first elongate rail for movement along a length of the first elongate rail, the cut-off blade having a shearing edge extending at an angle of approximately twenty-two and a half degrees relative to the opening direction and a punching tip that has a punching edge extending from a distal end of the shearing edge at an angle greater than or equal to the angle of the shearing edge relative to the opening direction;

a second driver coupled to the first cut-off blade for urging the first cut-off blade past the upper and lower arcuate jaws in a direction substantially parallel to the closing direction;

an elongate scarf blade having a piercing tip at one longitudinal end, the elongate scarf blade being supported on the second elongate rail for movement along a length of the second elongate rail in a second direction transverse to the opening and closing directions; and a third driver coupled to the scarf blade for urging the scarf blade past the upper arcuate jaw for cutting a notch in a work piece to a depth of a square circumscribed in the upper and lower arcuate jaws.

3. A tube cutter, comprising:

a machine frame;

at least a first elongate rail supported on the frame;

first and second jaws supported on the frame, the second jaw being movable relative to the first jaw for clamping engagement of a work piece between the jaws;

a jaw block slidably movable along the first elongate rail relative to the first jaw in a first direction, the second jaw being coupled to the jaw block;

a motive member coupled to the jaw block for slidably moving the jaw block along the first elongate rail to urge the second jaw toward the first jaw in a closing direction parallel to the first direction;

at least a second elongate rail disposed on the jaw block in a relatively transverse relation to the first elongate rail, the jaw block being slidably movable along the first elongate rail to urge the second elongate rail toward the first jaw in a second direction parallel to the first and closing directions;

a cut-off blade supported on the first elongate rail for movement along a length of the first elongate rail in a cut-off direction parallel to the first, second, and closing directions; and a scarf blade supported on the second elongate rail, for movement along a length of the second elongate rail in a scarfing direction relatively transverse to the cut-off direction.

4. The tube cutter of claim 3, wherein the scarf blade is elongate and extends longitudinally in the second direction, the scarf blade having a piercing tip on a longitudinal end of the scarf blade.

5. The tube cutter of claim 3, wherein the cut-off blade comprises a shearing edge that has an angle in a range from ten to thirty degrees relative to the first cut-off direction.

6. The tube cutter of claim 5, wherein the angle is approximately twenty-two and a half degrees.

7. The tube cutter of claim 5, wherein the cut-off blade has a punching tip that has a punching edge extending at an angle greater than or equal to the angle of the shearing edge relative to the first cut-off direction, the punching tip extending distally from the shearing edge.

8. The tube cutter of claim 7, wherein the angle of the punching edge is approximately forty-five degrees relative to the first cut-off direction.

9. The tube cutter of claim 3, wherein:

the first and second jaws are each semi-circular;

the scarf blade is supported at a position for cutting a notch substantially along a ninety degree arc of the tube.

10. A tube cutting system, comprising:

a machine base and a frame supported on the machine base;

a lower jaw supported on the base;

a first elongate rail supported on the frame;

an upper jaw supported on the first elongate rail, the upper jaw being movable along the first elongate rail relative to the lower jaw in a first direction and adapted for clamping engagement of a work piece between the upper and lower jaws;

a cut-off blade supported on the first elongate rail for movement along a length of the first elongate rail in a cut-off direction parallel to the first direction;

a cut-off blade driver coupled to the cut-off blade for urging the cut-off blade along the first elongate rail;

a second elongate rail supported on the frame in a relatively transverse relation to the first elongate rail;

a scarf blade supported on the second elongate rail for movement along a length of the second elongate rail in a second direction transverse to the first and cut-off directions;

a scarf blade driver coupled to the scarf blade for urging the scarf blade in the second direction;

a jaw block coupled to the upper jaw, the jaw block being slidably movable along the first elongate rail relative to the lower jaw in the first direction, the jaw block having the second elongate rail disposed thereon such that slidable movement of the jaw block along the first elongate rail toward the lower jaw urges the second elongate rail toward the lower jaw; and a jaw driver coupled to the jaw block for slidably moving the jaw block along the first elongate rail to urge the upper jaw and the second elongate rail toward the lower jaw in a closing direction parallel to the first and cut-off directions.

11. The tube cutting system of claim 10, wherein the cut-off blade comprises a shearing edge that has an angle in a range from ten to thirty degrees relative to the first closing direction.

12. The tube cutting system of claim 11, wherein the angle is approximately twenty-two and a half degrees.

13. The tube cutting system of claim 11, wherein the cut-off blade has a punching tip that has a punching edge extending at an angle greater than or equal to the angle of the shearing edge relative to the first closing direction, the punching tip extending from a distal end of the shearing edge.

14. The tube cutting system of claim 10, wherein the first elongate rail has a length greater than a space between the upper and lower jaws in a closed position such that the jaw driver can move the upper jaw away from the lower jaw to a distance greater than said space.

15. The tube cutting system of claim 10, wherein the scarf blade is supported on the jaw block with a lower edge of the scarf blade positioned at a chord of an inner surface of the upper jaw that forms one side of a circumscribed square in a clamping opening of the jaws when the jaws are in a closed position.

16. The tube cutting system of claim 10, further comprising a controller operatively connected to each of the drivers, the controller configured to move the upper jaw, the cut-off blade, and the scarf blade by way of the drivers in a coordinated manner.

* * * * *